US008721932B2

(12) United States Patent
Sneek

(10) Patent No.: US 8,721,932 B2
(45) Date of Patent: May 13, 2014

(54) METHOD OF MAKING AN ANTI-FOG GAUGE LENS

(75) Inventor: Brian Sneek, Markham (CA)

(73) Assignee: Flextronics Automotive Inc., Scarborough, Ontario (CA)

( * ) Notice: Subject to any disclaimer, the term of this patent is extended or adjusted under 35 U.S.C. 154(b) by 0 days.

(21) Appl. No.: 13/609,632

(22) Filed: Sep. 11, 2012

(65) Prior Publication Data

US 2013/0001813 A1 Jan. 3, 2013

Related U.S. Application Data

(62) Division of application No. 12/912,155, filed on Oct. 26, 2010, now Pat. No. 8,281,657, and a division of application No. 12/314,463, filed on Dec. 11, 2008, now Pat. No. 8,371,164, and a division of application No. 11/114,156, filed on Apr. 26, 2005, now abandoned.

(51) Int. Cl.
 *B29D 11/00* (2006.01)
(52) U.S. Cl.
 USPC .............................. 264/1.7; 264/2.5; 425/808
(58) Field of Classification Search
 USPC ......... 264/1.1, 1.7, 2.5, 2.7, 39, 166; 425/808
 See application file for complete search history.

(56) References Cited

U.S. PATENT DOCUMENTS

| 3,543,586 | A | 12/1970 | Waite |
| 4,154,110 | A | 5/1979 | Peart et al. |
| 4,628,731 | A | 12/1986 | Copeland |
| 5,376,317 | A * | 12/1994 | Maus et al. ................... 264/40.6 |
| 5,989,628 | A | 11/1999 | Haga et al. |
| 6,013,372 | A | 1/2000 | Hayakawa et al. |
| 6,165,256 | A | 12/2000 | Hayakawa et al. |
| 6,228,499 | B1 | 5/2001 | Nakauchi et al. |
| 6,297,906 | B1 | 10/2001 | Allen et al. |
| 6,303,229 | B2 | 10/2001 | Takahama et al. |
| 6,395,201 | B1 * | 5/2002 | Hunt et al. ..................... 264/1.9 |
| 6,455,162 | B1 | 9/2002 | Pier |
| 6,830,785 | B1 | 12/2004 | Hayakawa et al. |
| 2004/0067434 | A1 | 4/2004 | Kano et al. |
| 2004/0224161 | A1 | 11/2004 | Veerasamy |
| 2004/0253369 | A1 | 12/2004 | Jallouli et al. |
| 2005/0069639 | A1 | 3/2005 | Ogata et al. |
| 2006/0238870 | A1 | 10/2006 | Sneek |
| 2008/0318072 | A1 * | 12/2008 | Kawabata et al. ............ 428/461 |

FOREIGN PATENT DOCUMENTS

JP  60-195515  10/1985

* cited by examiner

*Primary Examiner* — Mathieu D. Vargot
(74) *Attorney, Agent, or Firm* — Volpe and Koenig, P.C.

(57) ABSTRACT

The gauge lens with anti-fog includes a substantially planar transparent lens substrate having an outer surface and an inner surface and a thin film possessing anti-fog properties adjacent and substantially covering the inner surface of the lens substrate to provide a low angle of contact for water and moisture. The anti-fog film is bonded to the lens substrate during the molding process that produces the lens substrate shape. The anti-fog film comprises a hydrophilic material or is coated with a hydrophilic coating. In addition to the anti-fog film, in another embodiment, the outer surface of the lens substrate has a hard coat film adjacent and substantially covering the outer surface of said lens. The materials for the lens substrate, anti-fog film, and hard coat film are selected based on the application, performance, and stability of the gauge lens in the environment that it is operated.

9 Claims, 9 Drawing Sheets

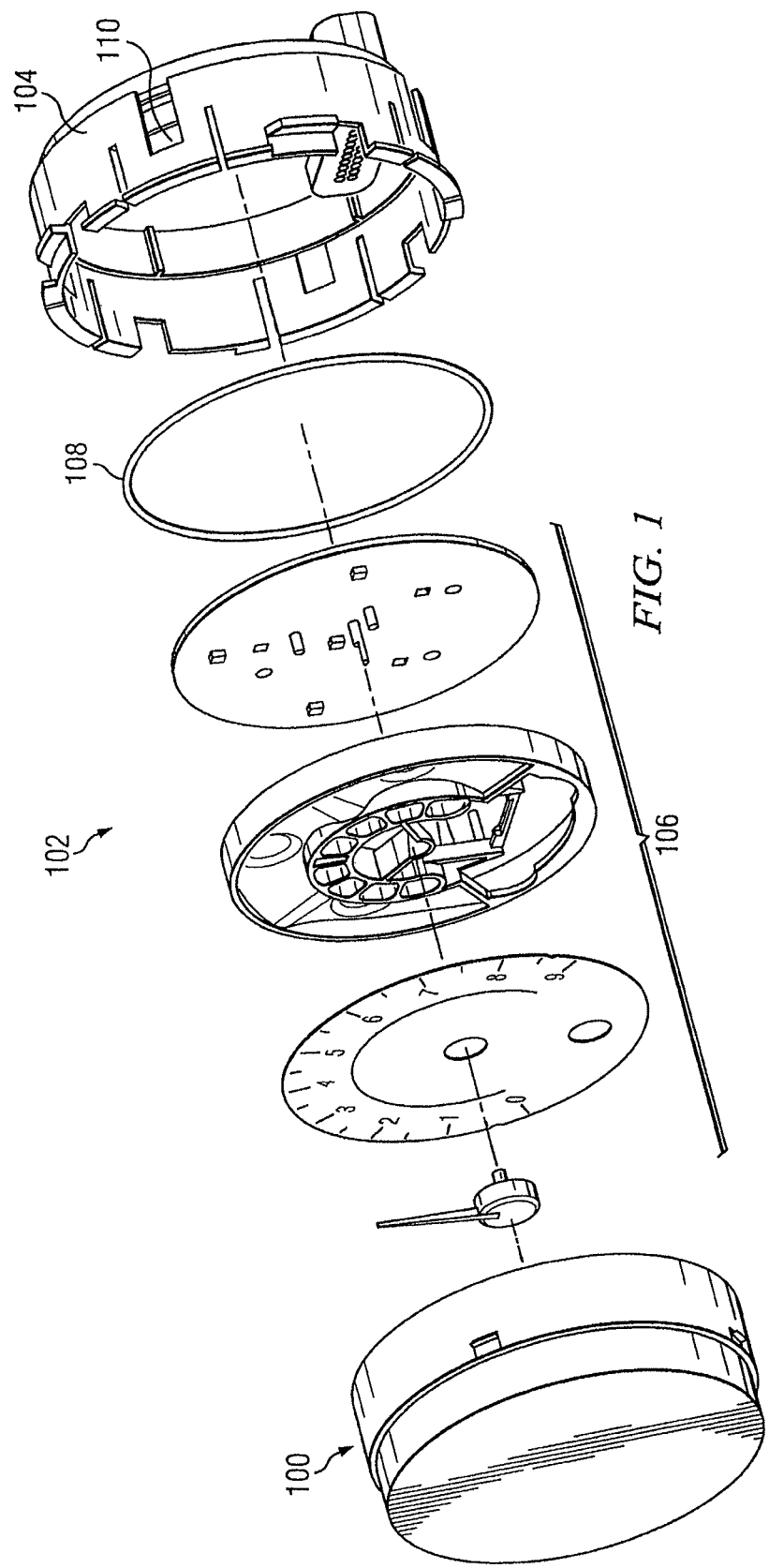

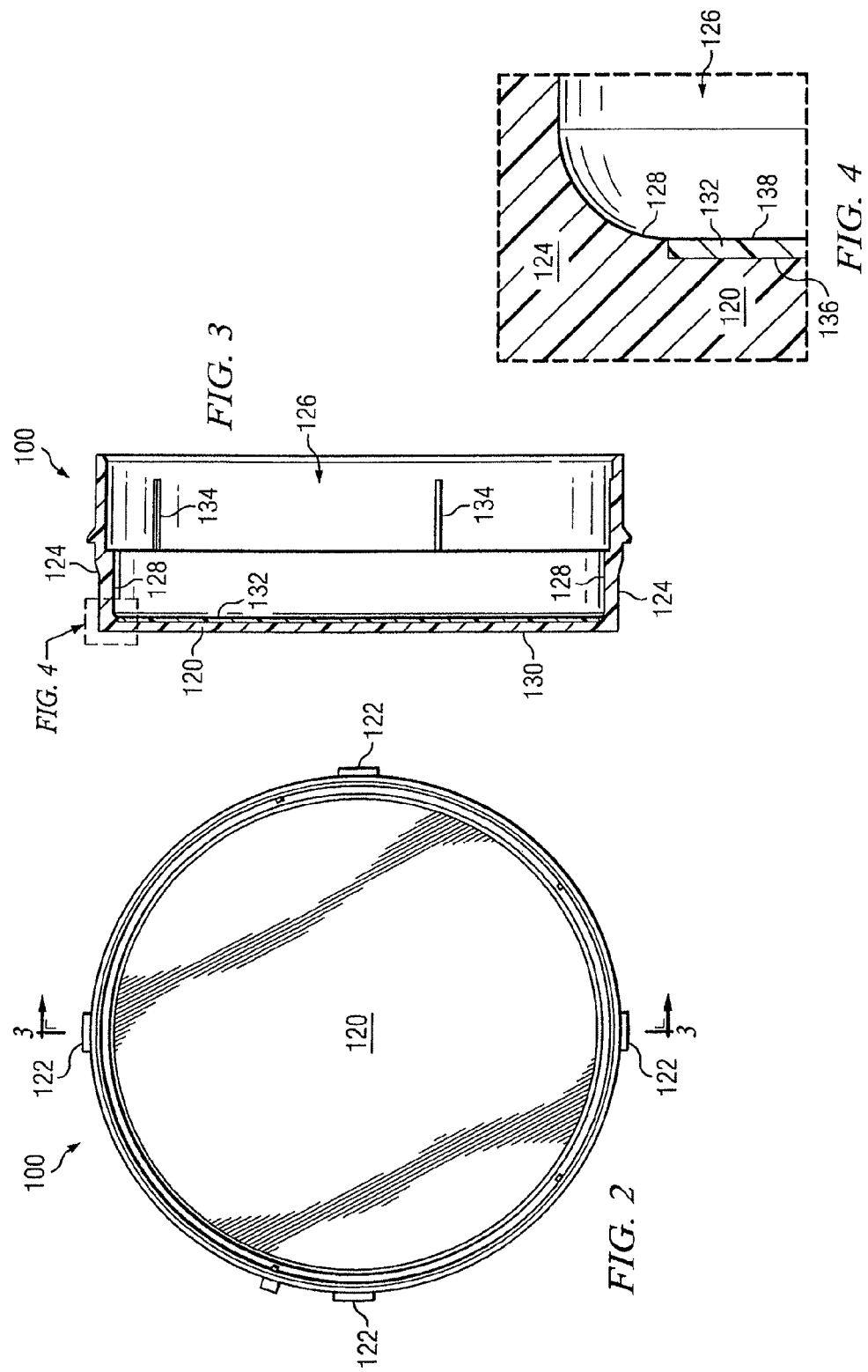

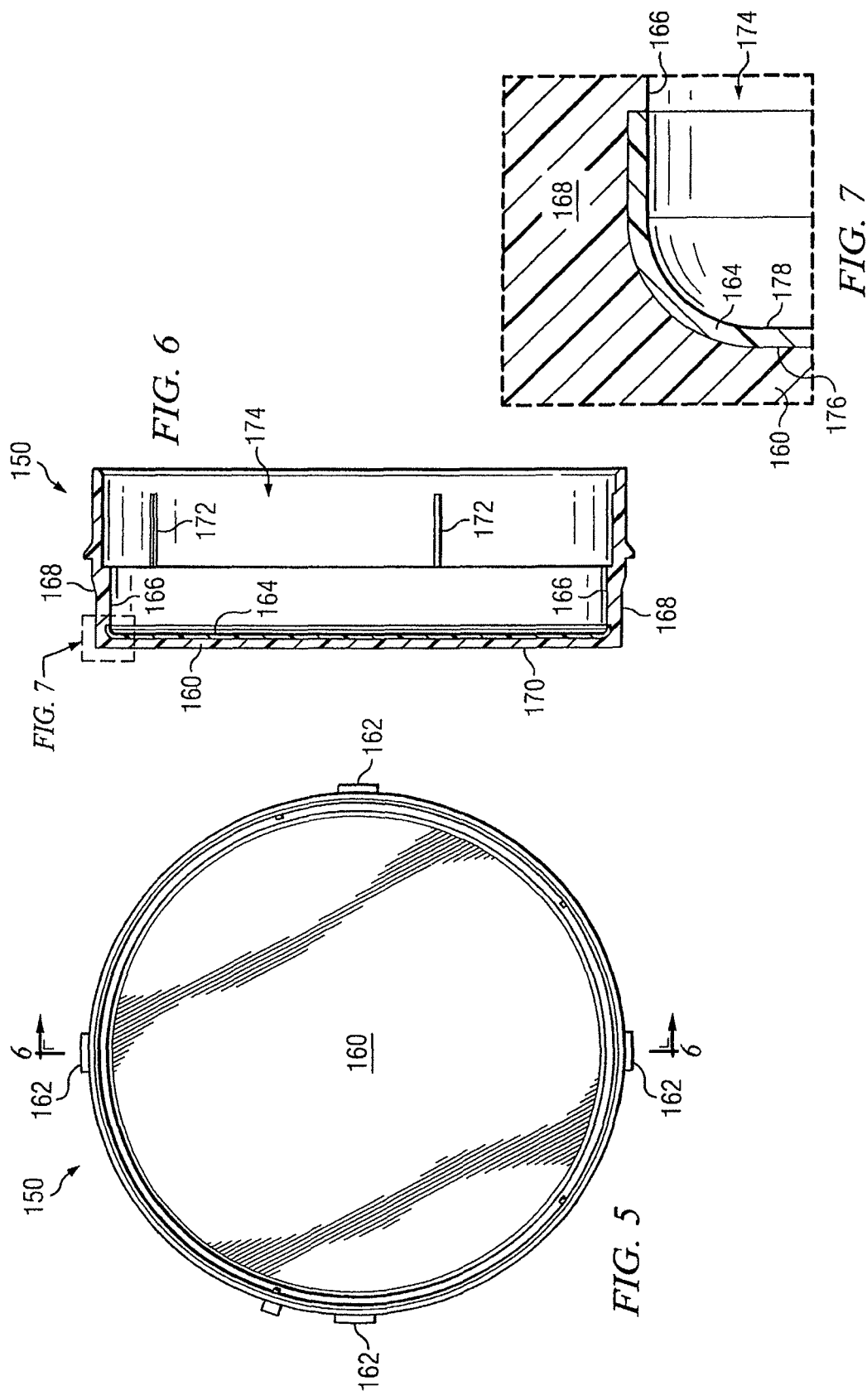

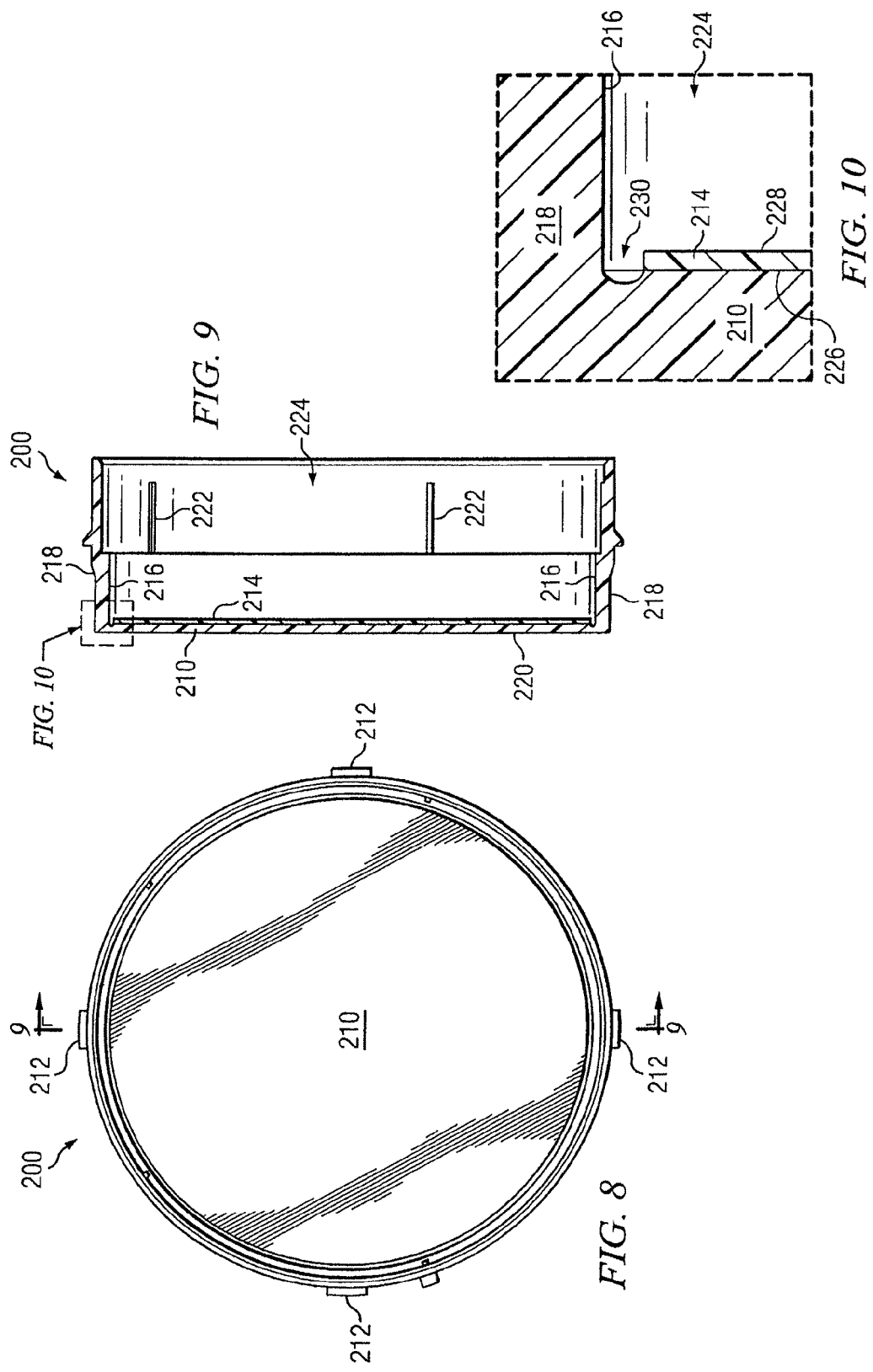

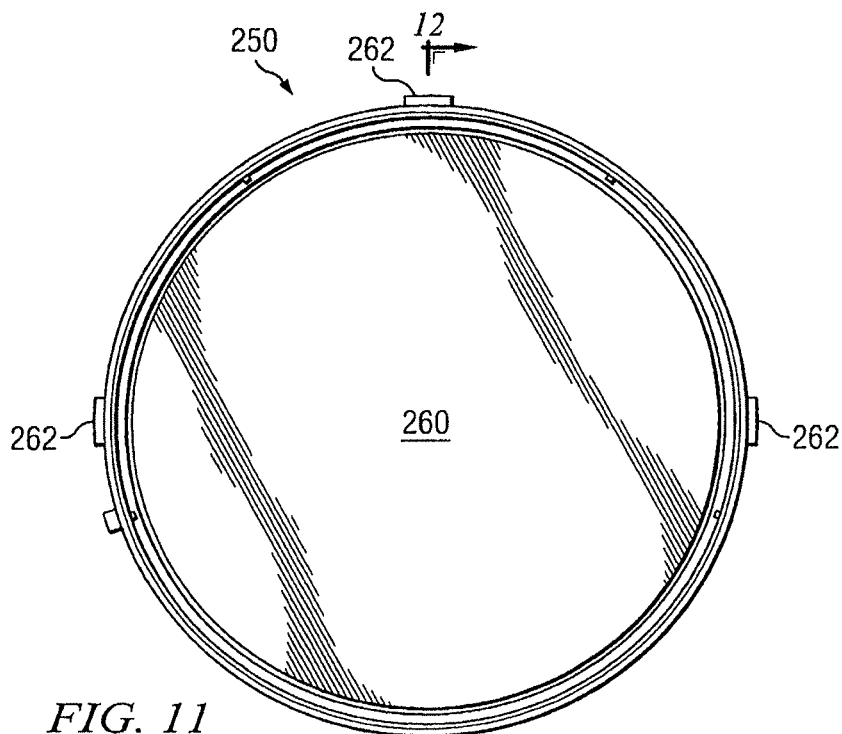
FIG. 11
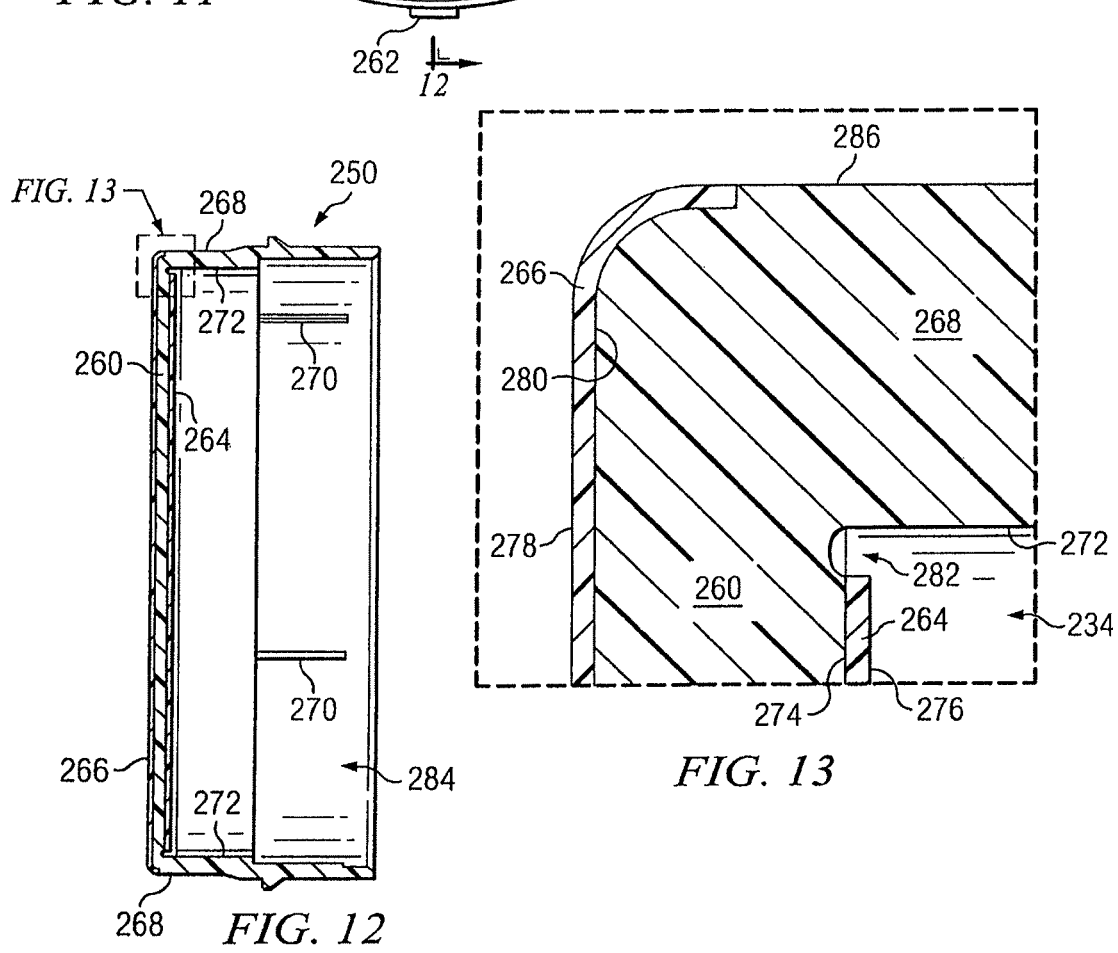
FIG. 12
FIG. 13

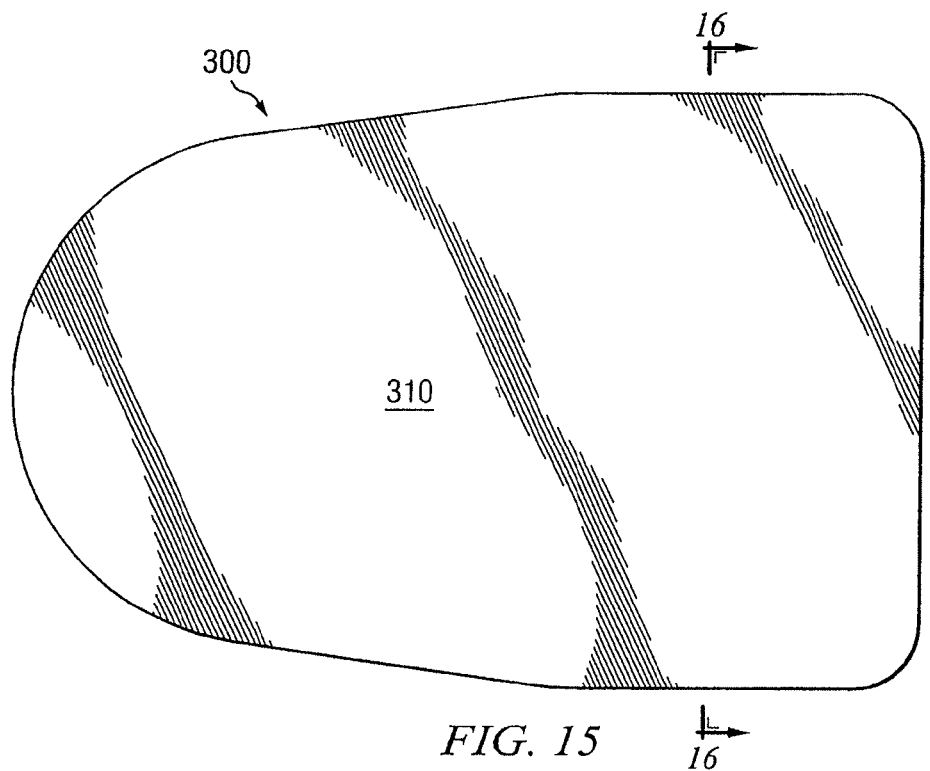
FIG. 15
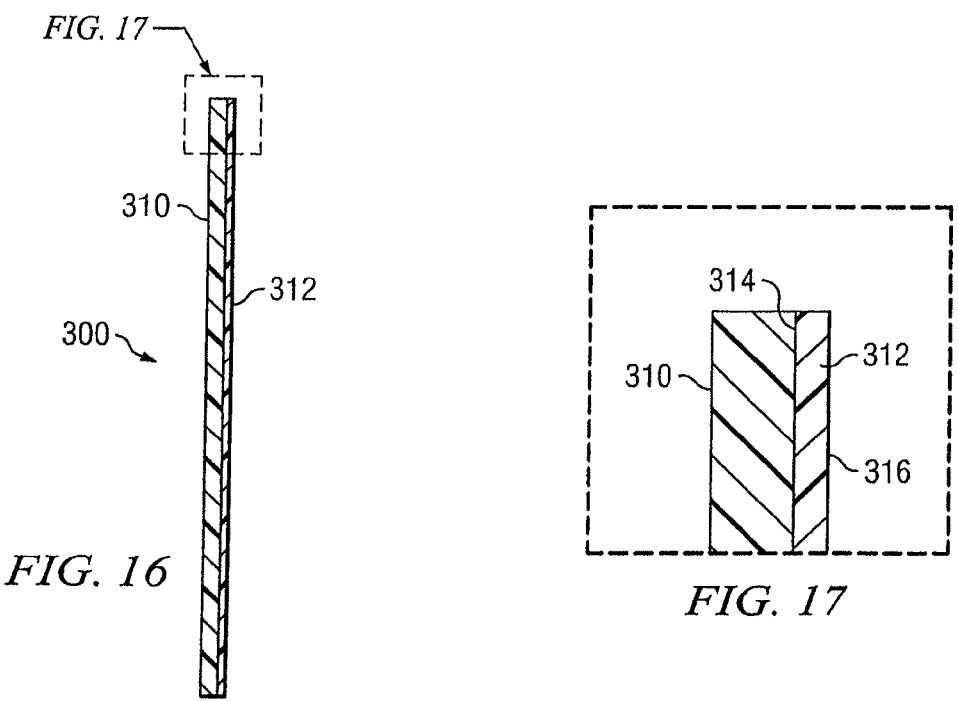
FIG. 16
FIG. 17

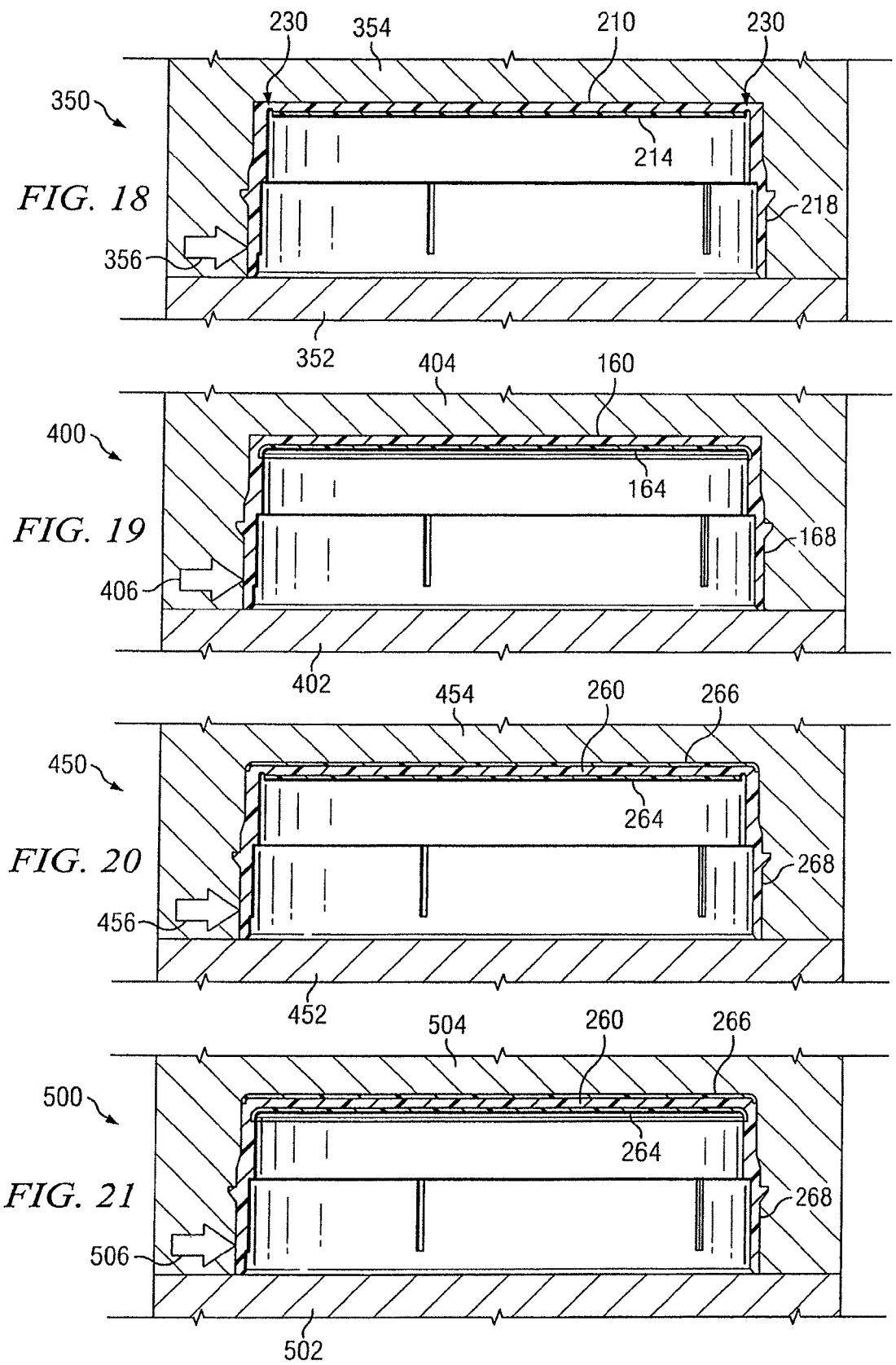

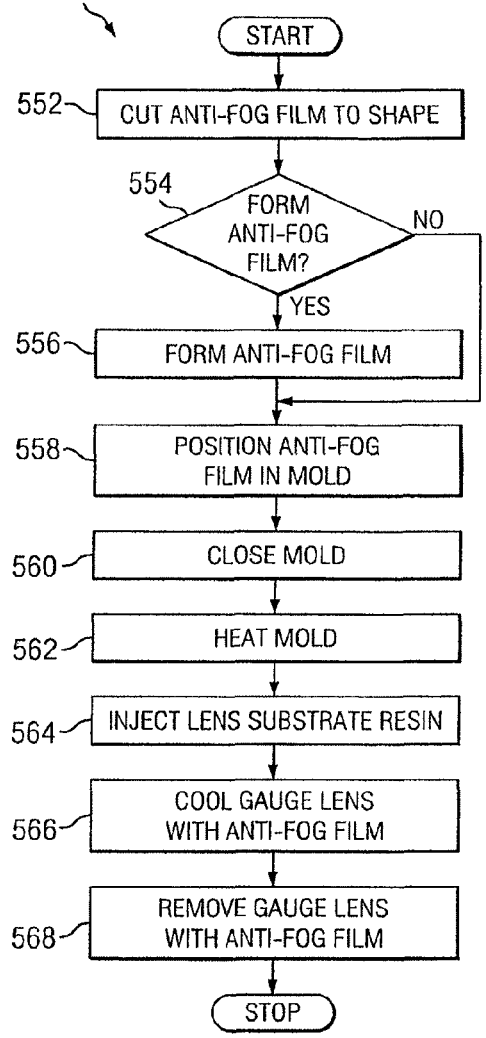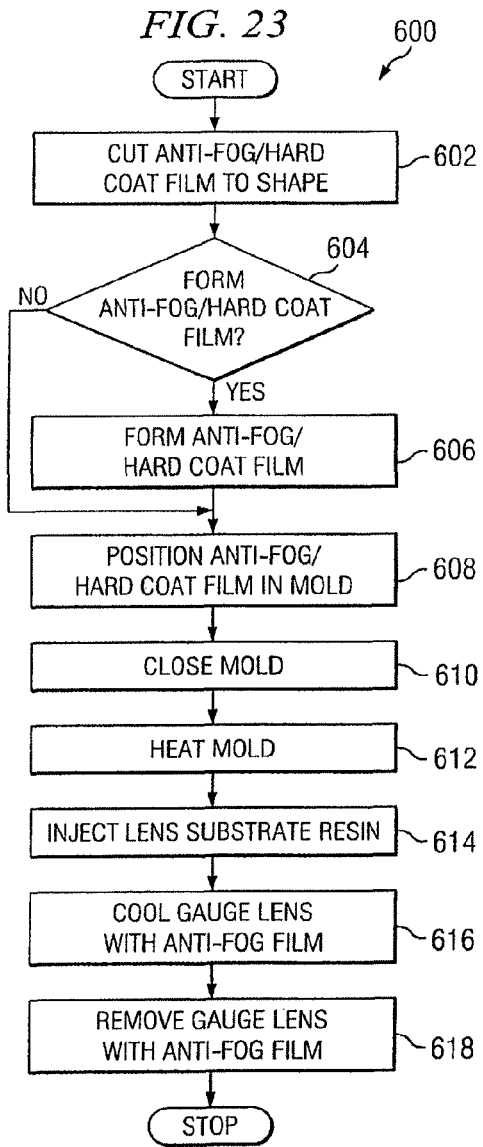

METHOD OF MAKING AN ANTI-FOG GAUGE LENS

CROSS REFERENCE TO RELATED APPLICATIONS

This application is a divisional of U.S. patent application Ser. No. 12/912,155, filed Oct. 26, 2010, which is a divisional of U.S. patent application Ser. No. 12/314,463, filed Dec. 11, 2008, which is a divisional of U.S. patent application Ser. No. 11/114,156, filed Apr. 26, 2005, now abandoned, which are incorporated by reference as if fully set forth.

FIELD OF INVENTION

This invention relates broadly to the field of rendering and maintaining a surface of a substrate highly hydrophilic, and more particularly relates to a gauge lens having an embedded film with anti-fog properties.

BACKGROUND

It is a problem in the field of sealed gauges, such as instruments, controls, instrument clusters, instrument panels, and the like, to alleviate moisture condensation from accumulating on the inner surface of the lens of these gauges when they are subjected to certain conditions. These gauges are typically formed of some type of acrylic and assembled in environments and factories that have some relative humidity, thus when they are sealed they typically contain the same relative humidity that was present during the manufacturing process for each particular gauge. In addition, when these gauges are subjected to certain environmental conditions, such as rain and cold weather, the moisture contained within the gauge forms condensation on the inner surface of the acrylic lens of that gauge and obscures or completely obstructs the view of a user to the information displayed by that gauge lens. Gauge lenses that possess a coating or are made out of a material that reduces the occurrence of moisture condensation formation during these conditions are commonly known as having anti-fog properties.

Additionally, acrylic lens provide good UV-stability relative to many of the anti-fog coatings and films presently used with other lens materials. Some attempts have been made to utilize lens substrates wholly composed of anti-fog material. However, these anti-fog materials do not typically provide good stability to UV exposure and tend to yellow and become brittle when exposed for prolonged periods of time to UV radiation, such as by repeated or constant exposure to the sun. Other attempts having been made to add LTV stabilizers to these anti-fog materials, but they still do not possess the UV stability of commonly used acrylics. Moreover, many manufacturers of vehicles that utilize these gauges require that the lens undergo extreme UV exposure testing.

In some applications, such as with automotive headlamps, the lens substrate is comprised of polycarbonate, that is prone to yellowing. Typically, to address this problem, the polycarbonate lens substrate is covered with a UV stable hard coat material to prevent yellowing of the polycarbonate lens substrate. To apply this hard coating the lens substrate material is usually spray or dip coated, which produces flow lines. Another disadvantage of dip or spray coating is that impurities that are part of the liquid coating become dried impurities of the anti-fog film once it dries. Some of these applications require 24 to 48 hours drying or curing times which exposes the coated lens to further airborne contaminates and impurities, such as dust. Other attempts have been made to alleviate or reduce moisture condensation from forming on the inner surfaces of these gauge lenses.

In one such attempt, an organic hard coat scuff-resistant layer is deposited on a release film and then pressed to one side of a flat sheet of polycarbonate and a hydrophilic organic hard coat anti-fog layer is deposited to another release film and pressed to the other side of the flat sheet of polycarbonate. The polycarbonate combination is then treated by ultraviolet (UV) radiation to cure the two coatings and the release films are then removed. The polycarbonate is then slightly bent to form such articles as shields for helmets and the like. This process provides for the polycarbonate lens substrate to be formed, deposited, and treated in flat sheets due to the nature of the process. The process does not provide for formed or shaped lenses for gauges, instruments, instrument clusters, or instrument panels. Further, the process as noted above involves a substantial number of time-consuming process steps, including preparing the two coatings, applying them to their respective release sheets, applying them to the polycarbonate substrate, pressing them to the substrate, treating with LTV radiation to cure the coatings, peeling the release films from the substrate, and possibly bending the film into a curved shape to produce a helmet visor, or the like.

Another approach to this problem has been to coat a surface of a lens substrate with a photocatalytic substance and then irradiating the coating in the presence of water to render it hydrophilic. Over time the coating loses its hydrophilic properties due to contaminants being absorbed on the surface of the hydroxyl groups of the coating surface. To restore the hydrophilicity, the coating is periodically subjected to additional photoexcitation treatments.

Yet another approach applies a coating of silicone resin to the surface of a lens substrate. Some application techniques include spraying or dip coating the lens substrate with the silicone resin. Coatings applied by dipping having only a poor-to-fair appearance, even if the parts are rotated during drippage. Additionally, coatings on vertical surfaces tend to be thicker at the bottom than at the top, which distorts the light rays emitting from the dial of the article through the lens material. Flow lines may be visible around holes and openings, and beads may develop at the bottom edges of the lens substrate. This type of process can be found in goggle manufacturing where the lens substrate is injection molded and then coated or dipped with an anti-fog compound. This process then requires that the anti-fog compound be cured or hardened, which incurs further process expense and time.

Information relevant to attempts to address these problems can be found in the U.S. Pat. No. 6,013,372 issued 11 Jan. 2000 to Hayakawa et al.; U.S. Pat. No. 6,165,256 issued 26 Dec. 2000 to Hayakawa et al.; U.S. Pat. No. 6,228,499 issued 8 May 2001 to Nakauchi; U.S. Pat. No. 6,297,906 issued 2 Oct. 2001 to Allen et al.; U.S. Pat. No. 6,303,229 issued 16 Oct. 2001 to Takahama et al.; and U.S. Pat. No. 6,830,785 issued 14 Dec. 2004 to Hayakawa et al.

Therefore, there is a need for a gauge having an embedded lens with anti-fog properties that is durable, highly hydrophilic, stable to UV-radiation, free from flow lines causes by dip or spray coating processes, affordable to manufacture, and that doesn't have or require complex processes such as UV-radiation treatment, curing or hardening steps, repeated hydrophilicity treatments, or require adhesives.

The above-described problems are solved and a technical advance is achieved in the art by the present gauge lens with embedded anti-fog. Preferably, the gauge lens comprises two layers of material, the anti-fog film and the lens substrate material, molded together to provide the gauge lens with improved weatherability, durability, and anti-fog properties.

The anti-fog properties of the anti-fog film are due to its inherent chemical composition or to an anti-fog coating that is applied to the film. The anti-fog film is adjacent to the lens substrate with the anti-fog side or coating of the film facing towards the interior of the gauge. Thus, when the gauge is exposed to conditions that promote moisture condensation, the gauge lens provides an anti-fog surface for preventing the moisture from condensing onto the lens and obstructing or obscuring the view of a user.

The gauge lens with embedded anti-fog film provides a lens with improved protection from exposure to elements, such as sunlight, extreme temperatures and variances thereof, and physical stresses causes during operation of the gauge in the environment in which it is designed to operate. The gauge lens provides for improved lamination quality between the lens substrate and the anti-fog film for better Xenon arc weather ability tests. In addition, the present gauge lens design provides for a gauge lens having anti-fog characteristics that is capable of withstanding thermal shock, and physical shocks, such as vibrational shock while maintaining the bond between lens substrate material and the anti-fog film.

A manufacturing process that molds the lens substrate and anti-fog film together during the process achieves these improved features. Preferably, the anti-fog film is placed in a mold prior to injecting the gauge lens substrate material into the lens. This process ensures a strong bond between the selected anti-fog film material and lens substrate material. In addition, due to the anti-fog film being intermolded with the lens substrate at a molding temperature, impurities that are present in the mold or caused by handling the materials are vaporized and thus are not part of the finished gauge lens product. The present gauge lens also provides for a second film to be molded to the outer layer of the lens substrate material for additional durability.

SUMMARY

The invention provides an anti-fog gauge lens, including a substantially planar transparent lens substrate having an outer surface and an inner surface; and a film having a first surface and a second surface, the first surface of the film is adjacent and substantially covering the inner surface of the lens, and the second surface having hydrophilic properties for preventing moisture condensation from forming on the second surface of the film. Preferably, the first surface of the film is bonded to the inner surface of the lens during the molding process of the lens. Preferably, the lens substrate comprises a thermoplastic material. Preferably, the lens substrate comprises a polymer selected from the group consisting of polyvinyl chloride, nylon, fluorocarbons, linear polyethylene, polyethylenes, polyethylene terephthalate, polyurethane prepolymer, polyesters, polycarbonates, polystyrene, polypropylene, cellulosic resins, acrylic resins, acrylates, methyl methacrylate, polymethy-methacrylate, epoxides, epoxies, plastics, and polymers or copolymers of acrylic acid, methacrylic acid, esters of these acids, and acrylonitrile. Preferably, the film comprises a material selected from linear polyethylene, polyethylenes, plastics, polycarbonates, polyethylene terephthalate, and acrylics. Preferably, the second surface of the film is coated with a hydrophilic coating. Preferably, the lens substrate is between 0.1 to about 10 millimeters in thickness. Preferably, the lens substrate is between 1 to about 3 millimeters in thickness. Preferably, the film is between 0.002 to about 0.020 inches in thickness. Preferably, the film is between 0.007 to about 0.010 inches in thickness. Preferably the lens further includes a hard coat film having a first surface and a second surface, the firs surface adjacent and substantially covering the outer surface of the lens. Preferably, the first surface of the hard coat film is bonded to the outer surface of the lens during the molding process of the lens. Preferably, the hard coat film comprises a material selected from the group consisting of polyvinyl chloride, fluorocarbons, polyethylenes, polyethylene terephthalate, polyurethane prepolymer, polycarbonates, polystyrene, polypropylene, cellulosic resins, acrylic resins, acrylates, methyl methacrylate, polymethyl-methacrylate, epoxides, epoxies, plastics, and polymers or copolymers of acrylic acid, methacrylic acid, esters of these acids, and acrylonitrile.

These and other features, aspects, and advantages of the present invention will become better understood with regard to the following description, appended claims, and accompanying drawings.

BRIEF DESCRIPTION OF THE DRAWINGS

FIG. 1 illustrates an exploded view of a gauge with an embodiment of a gauge lens with embedded anti-fog film of the present invention;

FIG. 2 illustrates a plan view of the gauge lens with embedded anti-fog film of FIG. 1 of the present invention;

FIG. 3 illustrates a cross-sectional view of the gauge lens with embedded anti-fog film of FIG. 2 through the lines 3-3 of the present invention;

FIG. 4 illustrates a detailed view of the gauge lens with embedded anti-fog film at reference number 4 of FIG. 3 of the present invention;

FIG. 5 illustrates a plan view of another gauge lens with embedded anti-fog film of the present invention;

FIG. 6 illustrates a cross-sectional view of the gauge lens with embedded anti-fog film of FIG. 5 through the lines 6-6 of the present invention;

FIG. 7 illustrates a detailed view of the gauge lens with embedded anti-fog film at reference number 7 of FIG. 6 of the present invention.

FIG. 8 illustrates a plan view of another gauge lens with embedded anti-fog film of the present invention;

FIG. 9 illustrates a cross-sectional view of the gauge lens with embedded anti-fog film of FIG. 8 through the lines 9-9 of the present invention;

FIG. 10 illustrates a detailed view of the gauge lens with embedded inner anti-fog film and outer hard coat film of the present invention;

FIG. 11 illustrates a plan view of another gauge lens with embedded inner anti-fog film and outer hard coat film of the present invention;

FIG. 12 illustrates a cross-sectional view of the gauge lens with embedded inner anti-fog film and outer hard coat film of FIG. 11 through the lines 12-12 of the present invention;

FIG. 13 illustrates a detailed view of the gauge lens with embedded inner anti-fog film and outer hard coat film at reference number 13 of FIG. 12 of the present invention;

FIG. 15 illustrates a plan view of the gauge lens with embedded anti-fog film of FIG. 14 of the present invention;

FIG. 16 illustrates a cross-sectional view of the gauge lens with embedded anti-fog film of FIG. 15 through the lines 16-16 of the present invention;

FIG. 17 illustrates a detailed view of the gauge lens with embedded anti-fog film at reference number 17 of FIG. 16 of the present invention;

FIG. 18 illustrates a cross-sectional view of an embodiment of an injection mold for producing the gauge lens with embedded anti-fog film of FIG. 8 of the present invention;

FIG. 19 illustrates a cross-sectional view of an embodiment of an injection mold for producing the gauge lens with embedded anti-fog film of FIG. 5 of the present invention;

FIG. 20 illustrates a cross-sectional view of an embodiment of an injection mold for producing the gauge lens with embedded anti-fog film of FIG. 11 of the present invention;

FIG. 21 illustrates a cross-sectional view of an embodiment of an injection mold without a peripheral lip for producing the gauge lens with embedded anti-fog film of FIG. 11 of the present invention;

FIG. 22 illustrates process flow diagram for a gauge lens with embedded ant-fog film of FIGS. 2, 5, 8, and 15; and FIG. 23 illustrates another process flow diagram for a gauge lens with embedded anti-fog film of FIG. 11.

DETAILED DESCRIPTION OF THE PREFERRED EMBODIMENTS

Figure 14:
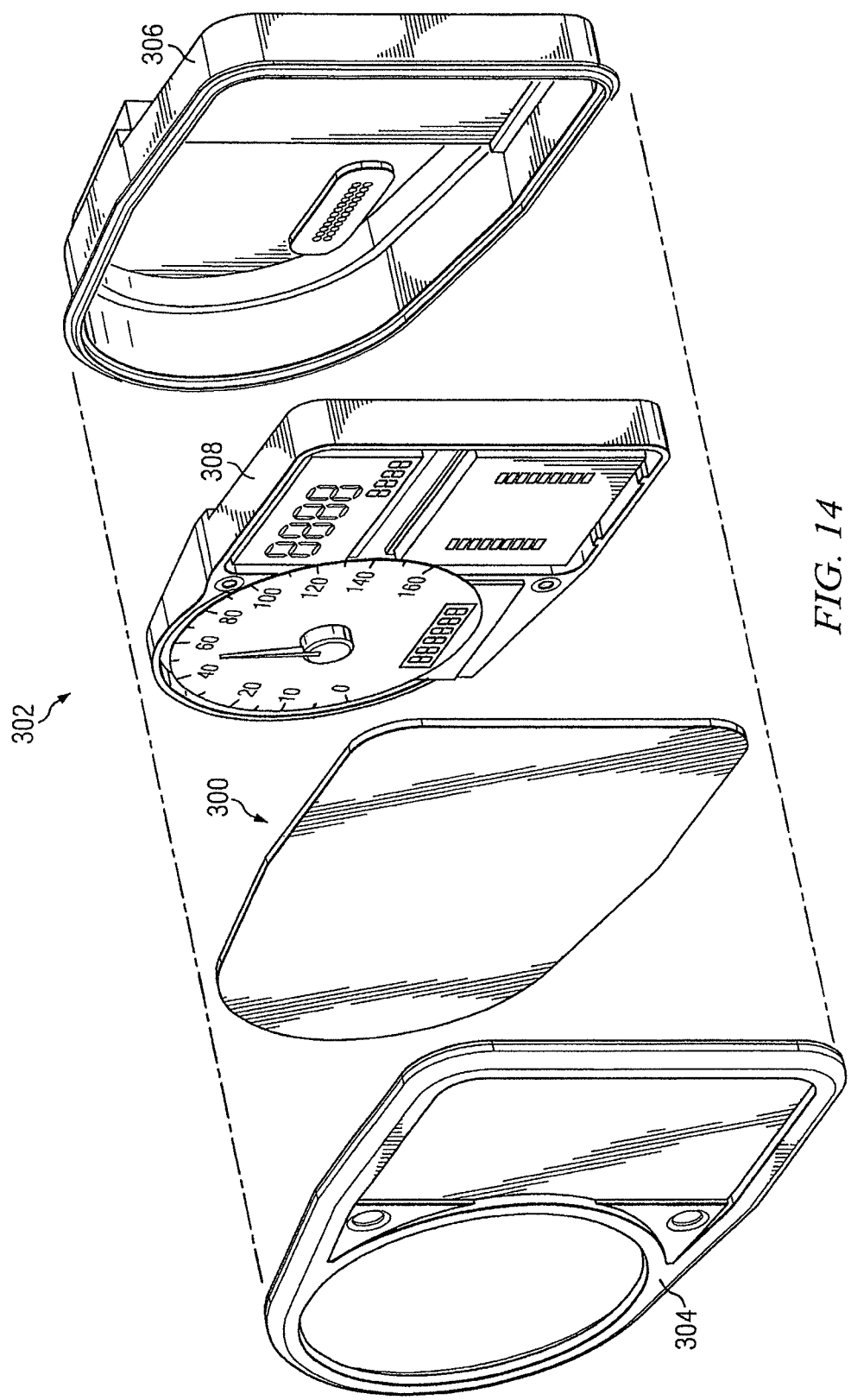
FIG. 14 illustrates an exploded view of another gauge with another embodiment of a gauge lens with embedded anti-fog film of the present invention.

In accordance with the present gauge lens with embedded anti-fog film ("gauge lens"), the gauge lens may be part of many different types of sealed articles, including barometers, meters, instruments, instrument clusters, instrument panels, goggles, glasses, or other such lensed articles. The gauge lens is to be used with gauges for all vehicles that are exposed to environmental conditions and moisture, such as all-terrain vehicles (ATV's), snowmobiles, motorcycles, and the like. Additionally, the gauge lens is also used with gauges that are exposed to environmental conditions that may not be part of vehicles, but are part of instruments such as weather stations, and the like.

FIG. 1 illustrates an embodiment of the present gauge lens 100 and is shown as part of a gauge 102, which preferably includes a gauge housing 104, a seal 108, and mechanical and electrical components 106. A seal 108 preferably provides a watertight seal between the gauge lens 100 and the gauge housing 104 when assembled, thereby preventing moisture from entering the gauge 102 between the gauge housing 104 and the gauge lens 100. The gauge housing 104 preferably includes slots 110 for accepting tabs 122 (depicted in FIG. 2) of the gauge lens 100.

FIG. 2 illustrates the gauge lens 100, lens substrate 120, and a plurality of tabs 122 for mating with the corresponding slots 110 of the gauge housing 104 to connect or attach the gauge lens 100 to the gauge housing 104 during assembly. Other fastening arrangements commonly known may also be employed to secure the gauge lens 100 to the gauge housing 104. FIG. 3 illustrates a cross-section of the gauge lens 100 including the lens substrate 120 having a planar-shaped cross-section. The gauge lens 100 includes a sidewall 124 that extends annularly from the lens substrates 120 towards the gauge housing 104 that creates a cavity 126 of the gauge lens 100. The lens substrate 120 and sidewall 124 have an inner surface 128 that faces the cavity 126 of the inner of the gauge 102 and an outer surface 130 that faces outwardly from the gauge 102. An anti-fog film 132 is adjacent to the lens substrate 120. The gauge lens 100 further includes ribs 134 for providing additional rigidity to the gauge lens 100 and for securing some or all of the mechanical and electrical components 106 of the gauge 102. These mechanical and electrical components 106 typically include mechanisms, electronics, controls, and displays that are encapsulated or enclosed between the gauge lens and gauge housing when the gauge is assembled.

FIG. 4 illustrates a detailed view of the reference number 4 of FIG. 3 showing the lens substrate 120 and sidewall 124 of the gauge lens 100. In this embodiment, the anti-fog film 132 can be seen having a first surface 136 that faces and is adjacent to the lens substrate 120 and a second surface 138 that faces the cavity 126. In this embodiment, the lens substrate 120 has been molded so that the second surface 138 is flush with the inner surface 128 of the lens substrate 120 but does not wrap around to cover the inner surface 128 of the sidewall 124 of the gauge lens 100.

FIGS. 5 and 6 illustrate another embodiment 150 of the gauge lens where the anti-fog film 164 covers the inner surface 166 and a portion of the sidewall 168 of the lens substrate 160. As in FIG. 2, tabs 162 are provided for engaging the slots 110 of the gauge housing 104. FIG. 6 illustrates a cross-section of the gauge lens 150 including the lens substrate 160 having a planar-shaped cross-section. The gauge lens 150 includes a sidewall 168 that extends annularly from the lens substrate 160 towards the gauge housing 104 that creates a cavity 174 of the gauge lens 150. The anti-fog film 164 is adjacent to the lens substrate 160 and a portion of the inner surface 166 of the sidewall 168 of the gauge lens 150. Additionally, the gauge lens 150 further includes ribs 172 for providing additional rigidity to the gauge lens 150 and for securing some or all of the mechanical and electrical components 106 of the gauge 102.

FIG. 7 illustrates a detailed view of the reference number 7 of FIG. 6 showing the lens substrate 160 and sidewall 168 of the gauge lens 150. In this embodiment, the anti-fog film 164 can be seen having a first surface 176 that faces and is adjacent to the lens substrate 160 and a second surface 178 that faces the cavity 174. In this embodiment, the lens substrate 160 and sidewall 168 have been molded so that the second surface 178 of the anti-fog film 164 is flush with the inner surface 166 of the lens substrate 160 and does wrap around and is flush with a portion of the sidewall 168 of the lens substrate 160.

FIGS. 8 and 9 illustrate another embodiment 200 of the gauge lens where the anti-fog film 214 covers the inner surface 216 of the lens substrate 210. As in FIG. 2, tabs 212 are provided for engaging the slots 110 of the gauge housing 104. FIG. 9 illustrates a cross-section of the gauge lens 200 including a lens substrate 210 having a planar-shaped cross-section. The anti-fog film 214 is adjacent to the lens substrate 210 and preferably covers the entire inner surface 216 of the lens substrate 210. FIG. 10 illustrates a detailed view of the reference number 10 of FIG. 9 showing the lens substrate 210 and sidewall 218 of the gauge lens 200. In this embodiment, the anti-fog film 214 can be seen having a first surface 226 that faces and is adjacent to the lens substrate 210 and a second surface 228 that faces the cavity 224. In this embodiment, the anti-fog film 214 has been molded so that the anti-fog film 214 meets an inner peripheral rim 230 of the lens substrate 210.

FIGS. 11 and 12 illustrate another embodiment 250 of the gauge lens having an anti-fog film material 264 that covers the inner surface 272 of the lens substrate 260 and a hard coat film 266 that covers the outer surface 284 of the lens substrate 260. As in FIG. 2, tabs 262 are provided for engaging the slots 110 of the gauge housing 104. FIG. 12 illustrates a cross-section of the gauge lens 250 including a lens substrate 260 having a planar-shaped cross-section. The anti-fog film 264 is adjacent to the lens substrate 260 and preferably covers the entire inner surface 272 of the lens substrate 260 and a hard coat film 266 that preferably covers the entire outer surface 286 of the lens substrate 260. FIG. 13 illustrates a detailed view of the reference number 13 of FIG. 12 showing the lens substrate 260 and sidewall 268 of the gauge lens 250. In this embodiment, the anti-fog film 264 can be seen having a first surface 274 that faces and is adjacent to the lens substrate 260 and a second surface 276 that faces the cavity 284. In addition, the hard coat film 266 can be seen having a first surface 280 that faces and is adjacent to the outer surface 286 of the lens substrate 260 and a second surface 278 that faces away from the lens substrate 260. This embodiment provides for a durable lens substrate 260 having an anti-fog film 264 molded to the inner surface 272 of the lens substrate 260 for providing anti-fog properties to the inner surface 272 of the lens substrate 260 and sidewall 268 and an outer hard coat film 266 for improved UV stability and durability to the outer surface 286 of the lens substrate 260.

FIG. 14 illustrates another embodiment of the present gauge lens 300 and is shown as part of an instrument panel 302, which preferably includes an instrument panel housing 306, and mechanical and electrical components 308. FIG. 15 illustrates the gauge lens 300 and the lens substrate 310. FIG. 16 illustrates a cross-section of the gauge lens 300 including the lens substrate 310 having a planar-shaped cross-section. An anti-fog film 312 is adjacent to the lens substrate 310 and preferably covers the entire inner surface of the lens substrate 310.

FIG. 17 illustrates a detailed view of the reference number 17 of FIG. 16 showing the lens substrate 310 and the anti-fog film 312 of the gauge lens 300. In this embodiment, the anti-fog film 312 can be seen having a first surface 314 that faces and is adjacent to the lens substrate 310 and a second surface 316 that faces the instrument panel housing 306.

In addition to being the cross-section being planar-shaped, lens substrate 110, 160, 210, and 260, and 310 can further be concave, convex, or dish-shaped depending on the desired application. In these embodiments, the lens substrate 110, 160, 210, and 260 are depicted as being circular, however, they can be other symmetrical and asymmetrical shapes, as shown in lens substrate 310. The gauge housing and mechanical and electrical components of the gauge described herein accept and work with each of the various embodiments of gauge lenses described above. One of the mechanical features of typical gauges is a reset mechanism, thus one aspect of the lens substrates 110, 160, 210, 260, and 310 is that they include a hole (not shown) where a mechanical stem or shaft (not shown) protrudes through to enable a user to reset some aspect of the gauge. A rubber enclosure (not shown) surrounds the stem or shaft and seals to the lens substrates 110, 160, 210, 260, and 310 for providing waterproof operation of the reset mechanism. In addition, the gauge housing 104 and instrument panel housing 306 receive a wiring harness or group of wires through the gauge housing 104 necessary for supplying electricity to the electronic devices within gauges 102 and 302. The wiring harness generally plugs into the back of the gauge housing 104 and instrument panel housing 306 and is sealed against the gauge housing 104 and instrument panel housing 306 for watertight operation.

The materials for the lens substrates 110, 160, 210, 260, and 310 are selected from transparent, clear, and thermoplastic materials that are capable of being heated and injected into a mold for forming the clear lens substrate. The material can be selected based upon certain criteria regarding the operation of the gauge. For example, if the criteria for Xenon arc weather ability test results is 200 hours as opposed to 1,000 hours, but high impact resistance is required, then the material for the lens substrates 110, 160, 210, 260, and 310 can be a polycarbonate or other material that provides high impact resistance, but lower LTV stability requirements. In addition, it is preferable that the materials for the lens substrates 110, 160, 210, 260, and 310 are thermoplastic, so that during the heating step of the manufacturing process, as described below, the materials fluidize and are able to be injected through an injector into the injection molds. These materials include polyvinyl chloride, nylon, fluorocarbons, linear polyethylene, polyethylenes, polyethylene terephthalate, polyurethane prepolymer, polyesters, polycarbonates, polystyrene, polypropylene, cellulosic resins, acrylic resins, acrylates, methyl methacrylate, polymethyl-methacrylate, epoxides, epoxies, plastics, and polymers or copolymers of acrylic acid, methacrylic acid, esters of these acids, and acrylonitrile. Some exemplary materials include polymethyl-methacrelate (PMMA) such as Asahi Kasei Delpet 80N and Cyro H15-002.

The materials for the anti-fog films 132, 164, 214, 264, and 312 are selected from transparent, clear films that are capable of withstanding the temperatures of injection molding processes without distortion of the transparent properties. The materials are provided in thin sheets that possess an anti-fog coating or composition on at least one side of the thin sheet. In addition, the anti-fog films 132, 164, 214, 264, and 312 are further selected based on their favorable bonding strength to the lens substrates 110, 160, 210, 260, and 310 during the mold injection process. The material can be selected based upon certain criteria regarding the operation of the gauge. The materials for the anti-fog films 132, 164, 214, 264, and 312 can be selected such that the composition of the anti-fog film 132, 164, 214, 264, and 312 itself possesses the anti-fog characteristics, or it can be a film that is coated with an anti-fog or hydrophilic coating. In one aspect, the material or coating possesses hydrophilic properties and in another aspect the material or coating possesses hydrophilic properties. Preferably, the anti-fog coating would be on the second surfaces 138, 178, 228, 276, and 316 of the anti-fog films 132, 164, 214, 264 and 312.

Some examples of materials for anti-fog films 132, 164, 214, 264, 312 include but are not excluded linear polyethylene, polyethlenes, plastics, polycarbonates, polyethylene terephthalate, acrylics or other clear material that possesses anti-fog properties and can be pressed into sheets of desirable thicknesses and that bond favorably to the selected lens substrate material. In one aspect of the present gauge lens, the anti-fog film 132, 164, 214, 264, and 312 is a polycarbonate material coated with a hydrophilic coating. An exemplary material includes Lexan® HP FAF from General Electric.

As noted above, preferably a strong bond is created between the lens substrates 110, 160, 210, 260, and 310 and the anti-fog films 132, 164, 214, 264, and 312. In one aspect of the present gauge lens, the lens substrate material is an acrylic and the anti-fog film is a polycarbonate, and in another the lens substrate material is a polycarbonate and the anti-fog film is a polycarbonate. In each of these two non-limiting examples, a sufficient or adequate bond is formed between the two materials during the injection molding process.

The materials for the hard coat film 266 are selected from transparent, clear films that are capable of withstanding the temperatures of injection molding processes without distortion of the transparent properties. The materials can be selected from those materials that are capable of being produced in thin sheets, preferably formable and that possess a durable and UV-resistant coating or composition that provides protection against UV-radiation and damage caused by operation of the gauge lens in its intended or desired environment. In addition, the hard coat film 266 is further selected based on their favorable bonding strength to the lens substrates 110, 160, 210, 260, and 310 during the mold injection process. The material can be selected based upon certain criteria regarding the environment that the gauge will be operated in.

Some examples of materials for those hard coat film 266 include polyvinyl chloride, fluorocarbons, polyethylenes, polyethylene terephthalate, polyurethane prepolymer, polycarbonates, polystyrene, polypropylene, cellulosic resins, acrylic resins, acrylates, methyl methacrylate, polymethylmethacrylate, epoxides, epoxies, plastics, and polymers or copolymers of acrylic acid, methacrylic acid, esters of these acids, and acrylonitrile.

The thickness of the lens substrates 110, 160, 210, 260, and 310 is dependent upon the desired application of the gauge lens. Preferable the lens substrate thickness is between 1 and 20 millimeters, and more preferably between 2 and 10 millimeters. The thickness of the anti-fog film 132, 164, 214, 264, and 312 is based on the design of the gauge lens. Preferably the anti-fog film thickness is between 0.002 and 0.020 inches, and more preferably between 0.007 and 0.010 inches.

Shapes of the gauge lens 100, 150, 200, 250, and 300 may be symmetrical or asymmetrical depending on the desired design or application. For example, there may be a substantially planar-shaped lens having a circular shape, such as a 4-inch diameter round gauge lens that are commonly found on ATV's and snowmobiles, such as that depicted in FIGS. 1 and 2.

In addition to the aforementioned aspects and embodiments of the present gauge lens 100, 150, 200, 250, and 300, the present invention further includes methods for making these embodiments of the gauge lens 100, 150, 200, 250, and 300.

Generally, the lens substrates 110, 160, 210, 260, and 310 and anti-fog film 132, 164, 214, 264, and 312 are bonded together during the injection molding process. Typically, the anti-fog film 132, 164, 214, 264, and 312 are cut, possibly shaped, and then positioned onto one half of a typical injection mold as commonly found in the injection molding art, such as those injection molds found in in-mold decoration (IMD) applications. The mold is then closed and then the lens substrate material is fed into a machine that heats and then injects the material into the mold. Molds are designed and made to produce a finished molded part that is required or desired by the application at hand.

FIG. 18 illustrates a cross sectional view of one embodiment 350 of an injection mold for producing the gauge lens 200. The mold 350 has a core side 352 and a cavity side 354 for intermolding the anti-fog film 214 against the lens substrate 210 to form the gauge lens 200. The mold 350 includes a peripheral lip 230 encircling the outer perimeter of the upper part of the core side 352 for accepting and holding the anti-fog film 214 in the place during injection of the lens substrate resin, through gate 356, into the mold 350 to mold the gauge lens 200 including the lens substrate 210, sidewall 218 and anti-fog film 214.

FIG. 19 illustrates a cross sectional view of another embodiment 400 of an injection mold for producing the gauge lens 150. The mold 400 has a core side 402 and a cavity side 404 for intermolding the anti-fog film 164 against the lens substrate 160 to form the gauge lens 150. The core side 402 accepts and holds a fitted, shaped, or thermofitted anti-fog film 164 in place during the injection of the lens substrates resin, through gate 406, into the mold 400 to mold the gauge lens 150 including the lens substrate 160, sidewall 168, and anti-fog film 164.

FIG. 20 illustrates a cross section view of another embodiment 450 of an injection mold for producing the gauge lens 250. The mold 450 has a core side 452 and a cavity side 454 for intermolding the anti-fog film 264 and the hard coat film 266 against the lens substrate 260 to form the gauge lens 250. The mold 450 includes a peripheral lip 282, similar to that described in FIG. 13, encircling the outer perimeter of the upper part of the core side 452 for accepting and holding the anti-fog film 264 in place. Additionally, the hard coat film 266 is formed or shaped to enable it to fit snugly or be pressed into the cavity side 454. Then lens substrate resin is injected, through gate 456, into the mold 450 to mold the gauge lens 250 including the lens substrate 260, sidewall 268 anti-fog film 264, and hard coat film.

FIG. 21 illustrates a cross sectional view of another embodiment 500 of an injection mold for producing the gauge lens 250. The mold 500 has a core side 502 and a cavity side 504 for intermolding the anti-fog film 264 and the hard coat film 266 against the lens substrate 260 to form the gauge lens 250. The core side 502 accepts a fitted, shaped, or thermoformed anti-fog film 164. Additionally, the hard coat film 266 is formed or shaped to enable it to fit snugly or be pressed into the cavity side 504. The lens substrate resin is injected, through gate 506, into the mold 500 to mold the gauge lens 250 including the lens substrate 260, sidewall 268 anti-fog film 264, and hard coat film 266.

The molds 350, 400, 450, and 500 may further include elements such as recesses, cavities, and the like for retaining the anti-fog film 132, 164, 214, 264, and 312 in the molds during the injection of the lens substrate resin material. Additionally, other means may be employed including applying a vacuum or static electricity to retain the anti-fog film 132, 164, 214, 264, and 312 in place in the mold during the injection process.

Preferably, the anti-fog film 132, 164, 214, and 312 is cut, by a die or other similar cutting tool, to a desired shape and then placed in the mold prior to injecting the lens substrate resin. As described above, the anti-fog film can also be formed prior to inserting it into the mold 400, 450, and 500 prior to injecting the lens substrate resin material. In one aspect, this can be accomplished by heating the anti-fog film 164, 214, and 264 and forming it to a desired shape prior and then allowing the anti-fog film 164, 214, and 264 to cool to a formed shape. The cut and/or shape anti-fog film 164, 214, and 264 is then placed, positioned, or pressed into typically one half of an open mold 350, 400, 450, and 500 of a molding machine. These molding machines are commonly used and can be arranged such that the molds are placed on a rotary table for inserting the anti-fog film 132, 164, 214, 264, and 312. The molds 350, 400, 450, and 500 may also be cleaned, such as by compressed air, prior to inserting the anti-fog film 132, 164, 214, 264, and 312 into the mold 350, 400, 450, and 500. After the anti-fog film 132, 164, 214, 264, and 312 is placed or inserted into one half of the mold, then the second half of the mold is typically closed down on top of the first half containing the anti-fog film 132, 164, 214, 264, and 312 and then the lens substrate material resin is injected into the mold. After injection of the resin, the material is then preferably cooled and then removed from the mold.

FIG. 22 illustrates an embodiment of a process 550 for manufacturing the gauge lens 100, 150, and 200. In step 552, the anti-fog film 132 and 214 is cut to a desired size to fit the core side 352 of mold 350. If it is determined in step 554 that the anti-fog film 164 is to be used, then anti-fog film 164 is shaped or formed in step 556 to fit the core side 402 of mold 400. In step 558, the anti-fog film 132 and 214 is positioned onto core side 352 of mold 350 and anti-fog film 164 is positioned onto core side 402 of mold 400. Then in step 560, the mold 350 and 400 are closed and prepared for heating and injection of the lens substrate resin material. In step 562, the mold 350 and 400 are heated and in step 564 the resin material that comprises the lens substrates 120 and 210 is injected into mold 350 and the resin material that comprises the lens substrate 160 is injected into mold 400. The lens substrates 120, 160, and 210 material then is cooled in step 566 and later removed in step 568 to provide a gauge lens 100, 150, and 200.

FIG. 23 illustrates another embodiment of a process 600 for manufacturing the gauge lens 250. In step 602, the anti-fog film 264 is cut to a desired size to fit the core side 452 of mold 450 and core side 502 of mold 500. If it is determined in step 604 that the anti-fog film 264 or hard coat film 266 is to be used, then it is shaped or formed in step 606. In step 606, the hard coat film 266 is formed to fit snugly into the cavity side 454 of mold 450. Also in step 606, the anti-fog film 264 and hard coat film 266 is formed to fit snugly into the core side 502 and cavity side 504, respectively, of mold 500. In step 608, the anti-fog film 264 is positioned onto core side 452 and the hard coat film 266 is positioned onto the cavity side 454 of mold 450, and the anti-fog film 264 is positioned onto core side 502 and the hard coat film 266 is positioned onto cavity side 504 of mold 500. Then in step 610, the mold 450 and 500 are closed and prepared for heating. In step 612, the mold 450 and 500 are heated and in step 614 the resin material that comprises the lens substrate 260 is injected into mold 450 and resin material that comprises the lens substrate 260 is injected into mold 500. The lens substrate 260 material then is cooled in step 616 and later removed in step 618 to provide a gauge lens 250.

In these molding methods, necessary flash and part lines in addition to vents are employed to optimize the molding process and finish of the gauge lens 100, 150, 200, 250, and 300. Structural cross ribs are incorporated into the design of the gauge lens as needed for structural strength.

The temperature of the injector and mold during the molding process is selected based upon the materials presented during the molding process. Preferably, the injection and molding temperature is between 100 and 600 degrees Fahrenheit. Once the gauge lens 100, 150, 200, 250, and 300 is molded and cooled, it may undergo further finishing steps, such as deburring or removing mold seams and/or runners if necessary prior to being assembled to the gauge body 104.

Several different connection arrangements are provided, including molding small tabs 122, 212, 162, and 262 on the side of the gauge lens 100, 150, 200, 250, and 300 that engage or snap into corresponding slots 110 in the gauge body 104. In addition, commonly known mechanical fixture devices can be used to assemble the gauge lens 100, 150, 200, 250, and 300 to the gauge housing 104 and instrument panel housing 306, respectively. This interface of the gauge lens 100, 150, 200, 250, and 300 and gauge body 104 and instrument panel housing 306 is preferably waterproof. Rubber o-rings or seals, such as seal 108, can also be employed between the interface of the gauge body 104, instrument panel housing 306 and the gauge lens 100, 150, 200, 250, and 300 to provide additional waterproofing properties.

EXAMPLE 1

Gauge Lens with Non-Formed Anti-Fog Film

A mold 350 was opened, cleaned, and prepared for forming gauge lens 200. The mold 350 provided for a 1.8 mm thickness sidewall 2128 and lens substrate 210. A 0.007 inch film of polycarbonate anti-fog film 214, Lexan® HP FAF produced by General Electric, was cut in a circular shape having a 4 inch diameter and positioned with the second surface 228 facing the core side 352 of mold 350. The mold 350 was then closed and attached to a nozzle of a heated screw injector. An acrylic polymer lens substrate 210 material, Acrylite Cyro H15-002, was placed into a hopper of the heated screw injector and then heated to 205° C. and injected into the mold 350. The mold 350 was allowed to cool to room temperature and the gauge lens 200 was removed and cleaned of molding seams or runners. The gauge lens 200 was subjected to Xenon arc light test ASTM G 155 and tested for 1,000 hours with no notice of de-lamination between the lens substrate 210 and the anti-fog film 214. In addition, no loss of anti-fog properties and no significant yellowing or degradation of the lens substrate 210 and anti-fog film 214 were noted. The gauge lens 200 was subjected to thermal shock of 100 cycles between +90° C. and −40° C. with no notice of de-lamination between the lens substrate 210 and the anti-fog film 214. Further, no loss of anti-fog properties were noted. The gauge lens 200 was then subjected to drop tests, by repeatedly dropping the lens substrate 200 from a distance of 3 meters from a concrete floor onto each of 6 axes (+/−x, +/−y, +/−z,) with no damage or de-lamination noticed between the lens substrate 210 and anti-fog film 214.

Although there has been described what is at present considered to be the preferred embodiments of the present gauge lens with anti-fog film, it will be understood that the gauge lens can be embodied in other specific forms without departing from the spirit or essential characteristics thereof. For example, additional means, other than those described herein, for retaining the anti-fog film to the mold during the injection process may be used. Also, other injection mold arrangements may be used other than those described herein without departing from the inventive novelty described herein. The present embodiments are, therefore, to be considered in all aspects as illustrative and not restrictive. The scope of the invention is indicated by the appended claims rather than the foregoing description.

What is claimed is:

1. A method for manufacturing an anti-fog gauge lens having a substantially planar transparent lens substrate having an outer surface and an inner surface, and a film having a first surface and a second surface, in an injection mold comprising a gate, a core side for molding said inner surface of said lens, and a cavity side for molding said outer surface of said lens; said method comprising:
   cutting said film to substantially fit the shape of said inner surface of said lens;
   positioning said second surface of said film on said core side of said mold;
   preparing said mold for accepting a resin material comprising said lens substrate;
   pre-heating the mold to a molding temperature prior to the molding process and heating the mold in which the film is positioned to maintain the molding temperature during a molding process, wherein the molding temperature vaporizes impurities in one or more of the mold, the film, and the resin material;
   injecting said resin material into said mold;
   forming an intermolded bond between the film and the inner surface of the substantially planar transparent lens during the molding process;
   cooling said mold; and
   removing said anti-fog gauge lens from said mold.

2. The method of claim 1, wherein said positioning further comprises:
   positioning said film between a peripheral rim on said core side of said mold.

3. The method of claim 1, further comprising:
   forming said film to fit snugly onto the core side of said mold.

4. The method of claim 1, wherein
heating said mold to a molding temperature facilitates the complete charging of said mold by said resin material.

5. A method for manufacturing an anti-fog gauge lens having a substantially planar transparent lens substrate having an outer surface and an inner surface, a film having a first surface and a second surface, and a hard coat film having a first surface and a second surface, in an injection mold comprising a gate, a core side for molding said inner surface of said lens, and a cavity side for molding said outer surface of said lens; said method comprising:
cutting said film to substantially fit the shape of said inner surface of said lens and said hard coat film to substantially fit the shape of said outer surface of said lens;
positioning said second surface of said film on said core side of said mold and said second surface of said hard coat film on said cavity side of said mold;
preparing said mold for accepting a resin material comprising said lens substrate;
pre-heating the mold to a molding temperature prior to the molding process and heating the mold in which the film is positioned to maintain the molding temperature during a molding process, wherein the molding temperature vaporizes impurities in one or more of the mold, the film, and the resin material;
injecting said resin material into said mold;
forming an intermolded bond between the film and the inner surface of the substantially planar transparent lens during the molding process;
cooling said mold; and
removing said anti-fog gauge lens from said mold.

6. The method of claim 5, wherein said positioning further comprises:
positioning said film between a peripheral rim on said core side of said mold.

7. The method of claim 5, further comprising:
forming said film to fit snugly onto the core side of said mold and said hard coat film to fit snugly into said cavity side of said mold.

8. The method of claim 5, wherein
heating said mold to a molding temperature facilitates the complete charging of said mold by said resin material.

9. A method for manufacturing an anti-fog gauge lens having a substantially planar transparent lens substrate having an outer surface and an inner surface, and a film having a first surface and a second surface, in an injection mold comprising a gate, a core side for molding said inner surface of said lens, and a cavity side for molding said outer surface of said lens; said method comprising:
cutting said film to substantially fit the shape of said inner surface of said lens;
forming said film to fit snugly onto the core side of said mold, wherein said film is heated, shaped and cooled to form a shape that fits snugly onto the core side of said mold;
positioning said second surface of said film on said core side of said mold;
preparing said mold for accepting a resin material comprising said lens substrate;
pre-heating the mold to a molding temperature prior to the molding process and heating the mold in which the film is positioned to maintain the molding temperature during a molding process, wherein the molding temperature vaporizes impurities in one or more of the mold, the film, and the resin material;
injecting said resin material into said mold;
forming an intermolded bond between the film and the inner surface of the substantially planar transparent lens during the molding process;
cooling said mold; and
removing said anti-fog gauge lens from said mold.

\* \* \* \* \*